(12) United States Patent
Inoguchi et al.

(10) Patent No.: US 6,181,301 B1
(45) Date of Patent: Jan. 30, 2001

(54) COMBINED DISPLAY PANEL

(75) Inventors: Kazuhiro Inoguchi, Toyota; Yoichi Kotanshi, Okazaki; Michio Kameyama, Toyota; Takeshi Ishikawa, Nishikasugai-gun; Koji Ogusu, Kariya, all of (JP)

(73) Assignee: Denso Corporation, Kariya (JP)

( * ) Notice: Under 35 U.S.C. 154(b), the term of this patent shall be extended for 0 days.

(21) Appl. No.: 08/899,569

(22) Filed: Jul. 24, 1997

(30) Foreign Application Priority Data

Jul. 26, 1996 (JP) .................................................. 8-198022
May 23, 1997 (JP) .................................................. 9-134024

(51) Int. Cl.$^7$ .................................................. B09G 5/00
(52) U.S. Cl. ..................................... 345/5; 345/4; 345/76
(58) Field of Search .................................. 345/4, 5, 7, 9, 345/36, 45, 76, 87; 353/13, 14; 340/815.55, 980; 362/29, 71, 77

(56) References Cited

U.S. PATENT DOCUMENTS

| | | | |
|---|---|---|---|
| 3,127,535 | * 3/1964 | Westerheim | 313/109.5 |
| 4,173,757 | * 11/1979 | Hareng et al. | 340/815.55 X |
| 4,371,870 | * 2/1983 | Biferno | 345/4 |
| 4,568,928 | * 2/1986 | Biferno | 345/5 |
| 4,818,048 | * 4/1989 | Moss | 345/7 |
| 5,361,165 | * 11/1994 | Stringfellow et al. | 345/9 X |

FOREIGN PATENT DOCUMENTS

| | | |
|---|---|---|
| 0 775 291 | 1/1999 | (EP) . |
| 55-16746 | 4/1980 | (JP) . |
| 55-39284 | 9/1980 | (JP) . |
| 60-191079 | 12/1985 | (JP) . |
| 61-11186 | 1/1986 | (JP) . |
| 3-17437 | 4/1991 | (JP) . |
| 7-271310 | 10/1995 | (JP) . |
| 9-207625 | 8/1997 | (JP) . |

* cited by examiner

Primary Examiner—Dennis-Doon Chow
(74) Attorney, Agent, or Firm—Pillsbury Madison & Sutro LLP

(57) ABSTRACT

A transparent electroluminescent display panel overlaps at least a part of a conventional instrument panel, and forms a combined display panel assembly. Overlapping front and back panel displays are selectively displayed. The front electroluminescent panel displays additional information such as navigation maps, and is turned off when such additional information is not required while the back panel is turned on. The present invention eliminates undesirable reflected images of the back panel vaguely shown on the front panel when the front panel is on and the back panel is off. A light attenuator, eliminates the reflected images. It decreases the intensity of light emitted from the front panel to the back panel, and is disposed between the back and the front panels or built into the electroluminescent panel, so that the reflected images are eliminated.

40 Claims, 18 Drawing Sheets

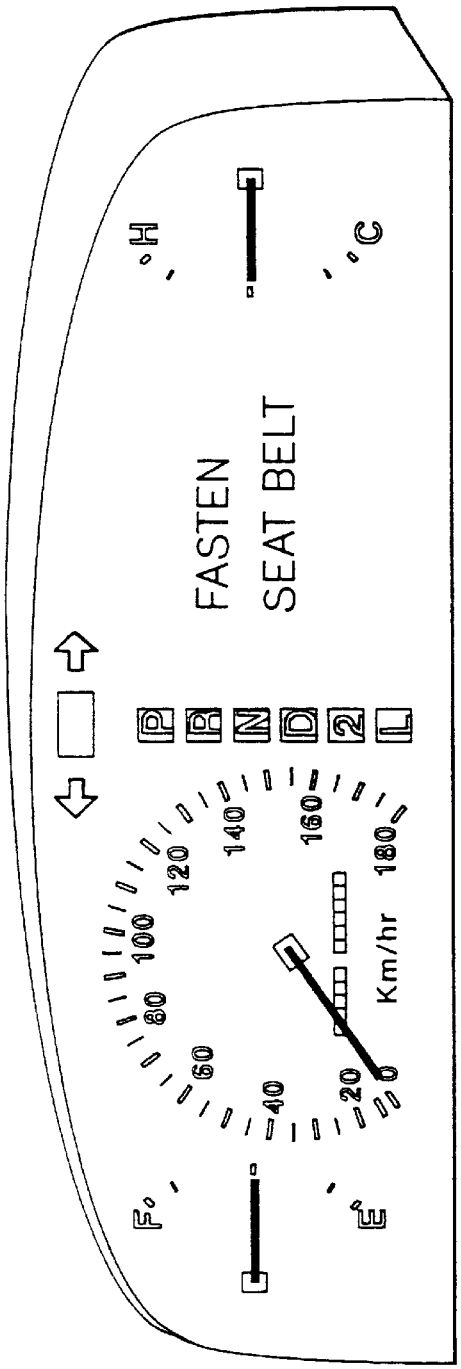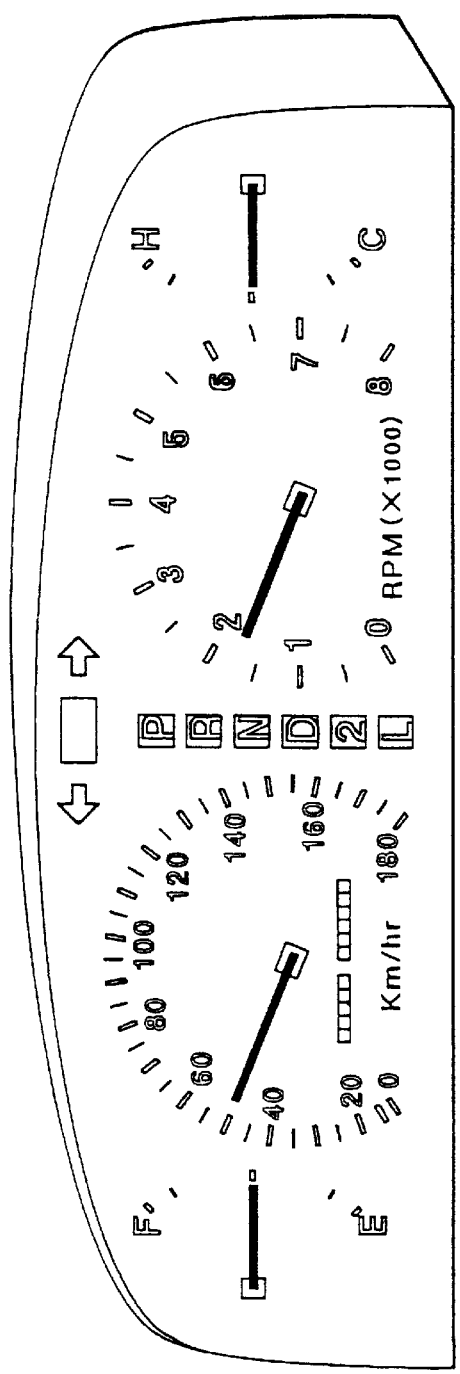

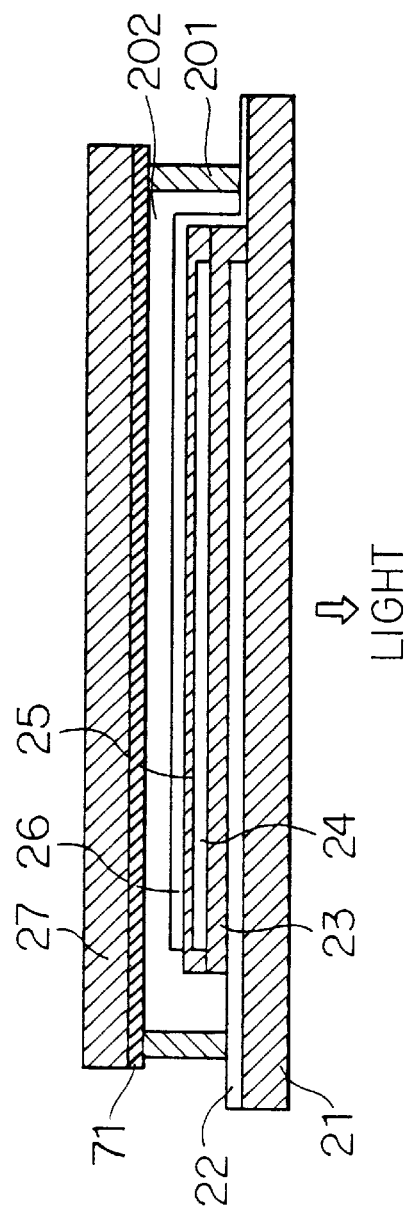
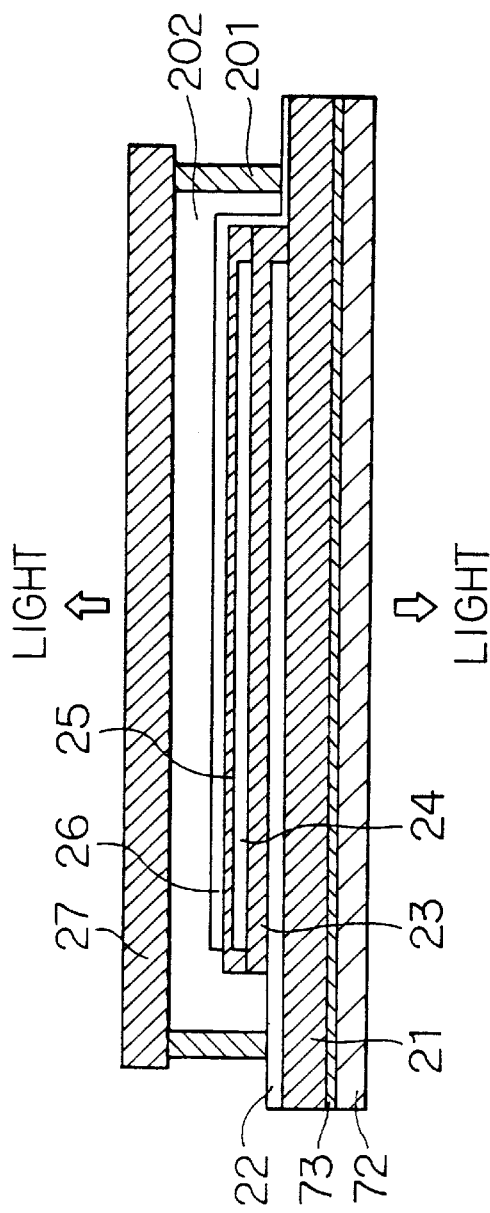

COMBINED DISPLAY PANEL

CROSS-REFERENCE TO RELATED APPLICATIONS

This application is based upon and claims benefit of priority of Japanese Patent Applications No. Hei-8-198022 filed on Jul. 26, 1996 and No. Hei-9-134024 filed on May 23, 1997, the contents of which are incorporated herein by reference.

BACKGROUND OF THE INVENTION

1. Field of the Invention

The present invention relates to a combined display panel for displaying various information thereon, and more particularly to a combined display panel in which a transparent display panel is disposed on a front surface of an instrument panel; the displays on both panels are selectively shown on the combined display panel for use in, for example, an automotive vehicle.

2. Description of Related Art

A combined display panel in which a transparent electroluminescent (EL) display panel is disposed on the front surface of a usual instrument panel has been proposed hitherto. For example, Japanese Utility Model Publication No. Hei-3-17437 discloses a combined display panel which is able to display images on a transparent front panel in addition to images displayed on a conventional panel.

Japanese Patent Laid-Open Publication No. Hei-7-271310 discloses a combined display panel in which a transparent liquid crystal panel is place in front of a back panel, and displays on the front and back panels are selectively switched. In other words, images on the back and the front panels are selectively displayed.

The combined display panel shown in the former Publication is to only add the images on the front panel to the images on the back panel. The combined display panel shown in the latter Publication is able to selectively switch the images on the front panel and on the back panel. It requires, however, a light controller for switching the displays on both panels made of polymer dispersed liquid crystal and a back light for illuminating the transparent liquid crystal panel, thereby making a whole device intricate. It is conceivable to place a transparent electroluminescent panel which does not placing require the light controller in front of the back panel and selectively switching both displays. In this structure of the combined display panel, however, there is a problem that an image of the back panel is vaguely visible through the front EL panel in addition to an image of the front panel when the back panel is turned off and the front panel is turned on. This means that the back panel image, when it is not desired, interferes the front panel image. This problem is caused by the fact that light emitted from the front EL panel also reaches the surface of the back panel and is reflected thereon, and the reflected image becomes visible through the front EL panel. This phenomenon is especially notable when pointers on the back panel are made of a light reflecting body such as a fluorescent tube.

SUMMARY OF THE INVENTION

The present invention has been made in view of the above-mentioned problem, and an object of the present invention is to provide a combined display panel in which a transparent electroluminescent (EL) display panel as a front panel overlaps and covers a certain part of a back panel. The displays on both panels on the overlapped part are selectively switched so that images reflected from the back panel, vaguely shown on the front panel, when the back panel is turned off and the front panel are turned on, is eliminated. Another object of the present invention is to eliminate an overall luminance imbalance between the overlapped area and the non-overlapped area of the combined display panel.

To eliminate the reflected images, the present invention provides several structures. Inserting a light attenuation filter between the back while front panels is one measure. Light emitted from the electroluminescent display panel overlapped on a part of the instrument panel. In this case, the back panel is turned off, is incident upon the inserted attenuation filter which attenuates intensity of the light. Therefore, the intensity of the reflected light on the surface of the back panel is decreased and the reflected images shown on the front panel are suppressed. A smoked glass plate or a half mirror may be used as the light attenuation filter.

The light attenuator may be included in the transparent electroluminescent panel itself. A light attenuation filter plate may be attached on one of the substrates of the EL panel which faces the back panel. The light emitted backward from the EL panel is attenuated by the filter plate. A light absorbing film which absorbs the light emitted from the EL panel toward the back panel may be disposed on the inner surface of an EL substrate facing the back panel. When the light attenuator is assembled in the EL panel as exemplified above, the combined display panel can be made smaller than the one having a separate light attenuator disposed between the back and front panels.

The light attenuation function may be included in various layers constituting the EL panel or a substrate thereof. For example, one of the transparent electrode layers positioned at the back panel side may be made thicker than the other so that the light emitted backward from a luminescent layer of the EL panel is absorbed thereby. It is also possible to use a smoked or colored glass plate which has the light attenuation function as one of the EL substrates facing the back panel. These elements of the EL panel having the light attenuation function serve to attenuate the light intensity from the luminescent layer of the EL panel directing to the back panel, and thereby to suppress the reflected images shown on the front panel.

Also, a halo phenomenon, which makes vague phantom images on the transparent EL display panel around peripheries of its real images by light scattered on surfaces of various layers in the EL panel, can be suppressed by attenuating light intensity by the light attenuator attached to or included in the EL panel. It is also useful to attach a film for preventing reflection on reflecting surfaces of the back panel including a display plate and pointers.

To eliminate the luminance imbalance on the combined display panel between the overlapped and non-overlapped parts, when the front panel is turned off and the back panel is turned on, a dimming filter, having different transparencies between the two parts, may be disposed to cover a whole surface of the combined display panel. The dimming filter has a higher transparency on the area covering the overlapped part than on the area covering the non-overlapped part and equalizes the overall luminance of the two parts of the combined display panel. The same results may be obtained by disposing a transparency adjustment filter, having the same transparency as the transparent EL panel, only to cover the non-overlapped part. Brightness of the back light illuminating the back panel may be adjusted so that the overall luminance of the combined display panel becomes uniform both on the overlapped and non-overlapped parts.

Other objects and features of the present invention will become readily apparent from a better understanding of the preferred embodiments described below with reference to the following drawings.

BRIEF DESCRIPTION OF THE DRAWINGS

FIG. 5A is a front view of the combined display panel showing images on the panel during an idling period;

FIG. 5B is a front view of the combined display panel showing images on the panel under a normal driving condition;

FIG. 12 is a cross-sectional view showing a transparent EL panel used in a second embodiment of the present invention;

FIG. 13 is a cross-sectional view showing another transparent EL panel used in the second embodiment of the present invention;

DETAILED DESCRIPTION OF THE PREFERRED EMBODIMENTS (First Embodiment)

Figure 1:
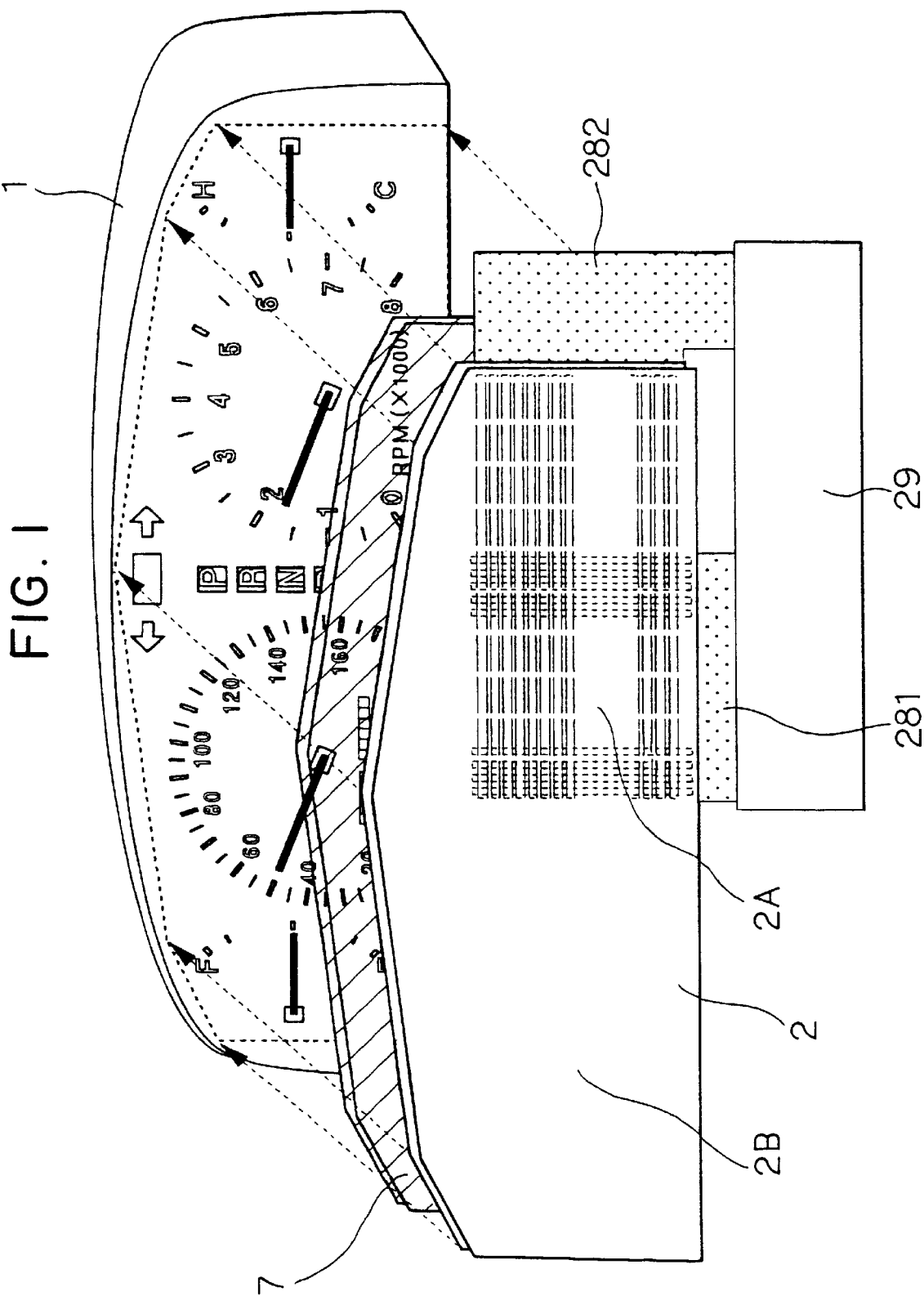
FIG. 1 is a schematic drawing showing a combined display panel including an instrument panel, a front transparent EL panel and an attenuation filter to be overlapped on the instrument panel, as a first embodiment according to the present invention.

Referring to FIGS. 1 through 11, a first embodiment according to the present invention will be described. FIG. 1 schematically shows a total structure of the first embodiment. An instrument panel 1 is a conventional type instrument panel, a so called combination meter, which includes a speedometer, a tachometer (engine rotational speed indicator), a fuel gauge, a coolant temperature gauge, and an odometer, etc. On the front surface of the panel 1, a transparent electroluminescent (EL) display panel 2 for displaying additional information thereon is overlapped, and a light attenuation filter 7 is disposed between the instrument panel 1 and the EL panel 2.

Figure 2:
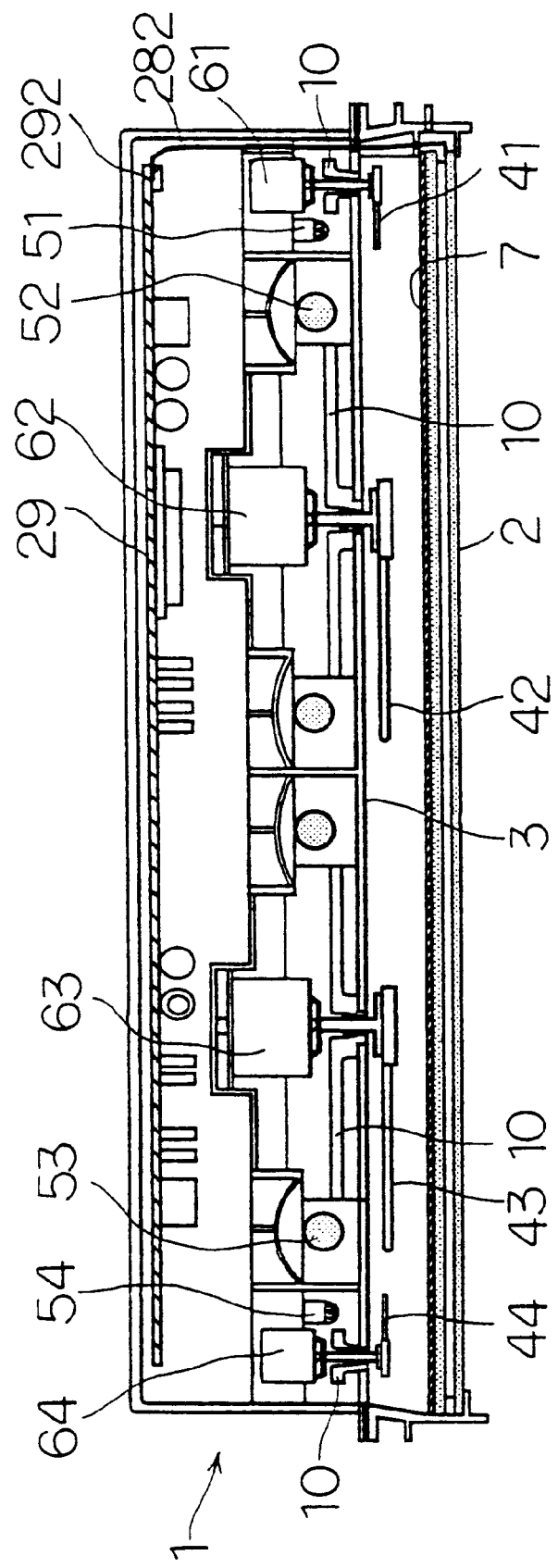
FIG. 2 is a cross-sectional view of the combined display panel viewed from the top of FIG. 1.

FIG. 2 is a cross-sectional view of FIG. 1 viewed from its top. Behind a display plate 3 there are installed illuminating lamps 51, 52, 53 and 54, each corresponding to the coolant temperature gauge, the tachometer, the speedometer and the fuel gauge, respectively. In front of the display plate 3 there are provided pointers of the respective meters and gauges, that is, a coolant temperature gauge pointer 41, a tachometer pointer 42, a speedometer pointer 43 and a fuel gauge pointer 44. The pointers are driven by respective drivers 61, 62, 63 and 64 which receive signals from respective sensors. The displays of the respective meters and gauges are turned on and off by switching the respective illuminating lamps on and off. The illuminating lamps 51 and 54 are incandescent lamps and the illuminating lamps 52 and 53 are ring-shaped fluorescent lamps. A part of light emitted from the respective illuminating lamps 51, 52, 53 and 54 is transmitted to the corresponding pointers 41, 42, 43 and 44 made of light transmissible resin through respective light transmitting paths 10. Another part of light emitted from the respective lamps is incident upon the display plate 3, and emitted through scales, numerals and other openings printed light-transmissibly on the display plate 3. The light incident upon the display plate 3 other than the scales and numerals is cut out thereon and does not come out from the display plate 3. Thus, the pointers and display plate are made luminous.

Figure 4:
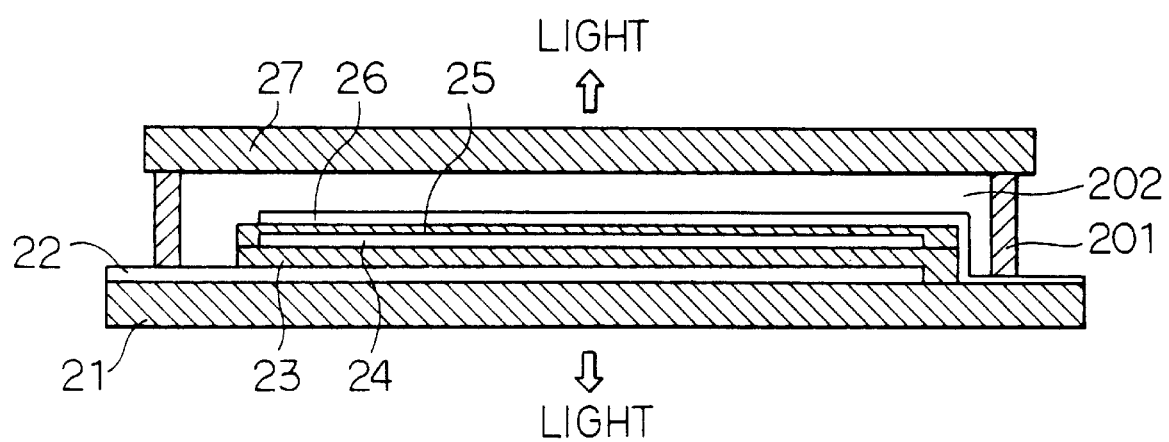
FIG. 4 is a cross-sectional view showing a transparent EL panel used in the combined display panel shown in FIG. 1.

FIG. 4 shows a transparent electroluminescent display panel 2 used in the first embodiment shown in FIG. 1. The panel 2 is composed of a front glass plate 21, a rear glass plate 27 and electroluminescent elements 22 through 26, the elements being hermetically held between the front and rear glass plates which are supported by a spacer 201 with a certain space 202 therebetween. In the space between two glass plates 21 and 27, silicone oil is filled. The electroluminescent elements include first transparent electrodes 22 made of ITO (indium-oxide, tin), ZnO (zinc-oxide) or the like; a first insulating layer 23 made of silicon-nitride-oxide, tantalum-oxide or the like; a luminescent layer 24 made of zinc-sulfide or the like as its base material; a second insulating layer 25 made of the same material as the first insulating layer; and second transparent electrodes 26 made of the same material as the first transparent electrodes 22. All of these layers 22 through 26 are formed on the front glass plate 21 in this order. The electroluminescent panel 2 to be used in the combined display device may be made of organic materials besides the inorganic materials described above.

The electroluminescent elements described above are formed only on the right side area 2A, and there is nothing formed on the left side area 2B as shown in FIG. 1. The EL panel is lit when an electric voltage is supplied between the first and second transparent electrodes 22 and 26, and turned off when the voltage is not supplied. The EL panel 2 is transparent to both surfaces, i.e., the surfaces of the front glass plate 21 and the back glass plate 27, and therefore light is emitted from both surfaces. In the first embodiment, the EL panel 2 is placed on the surface of the instrument panel 1, so that the front glass plate 21 faces the front side.

Figure 3:
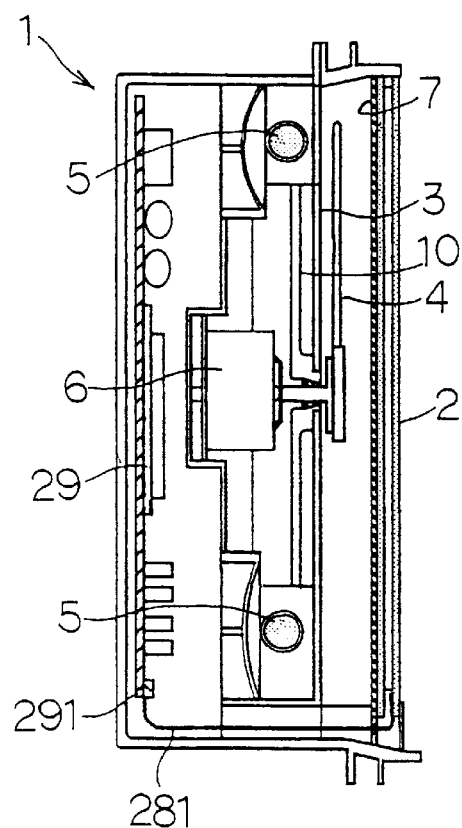
FIG. 3 is a cross-sectional view of the combined display panel viewed from the left side of FIG. 1.

The transparent electroluminescent panel 2 thus made is disposed to cover the front surface of the instrument panel 1 as shown in FIGS. 1 and 2. A light attenuation filter 7 is disposed between the instrument panel 1 and the EL panel 2. A circuit board 29 for driving and controlling the EL panel 2 is disposed at the back of meters and connected to the EL panel 2 through flexible wirings 281 and 282. As shown in FIGS. 2 and 3, the flexible wirings 281 and 282 are connected to the first and second transparent electrodes 22 and 26 at the right and bottom sides of the panel 2 by soldering. The flexible wirings 281 and 282 are also connected to the circuit board 29 through connectors 291 and 292. The light attenuation filter 7 disposed just behind the EL panel 2 is made of, for example, smoked glass, colored glass, transparent resin with black meshes printed thereon or formed therein, black colored resin having small transparent dots made thereon, or the like.

Exemplary displays to be shown on the combined display panel under various situations will be described referring to FIGS. 5A, 5B, 6A and 6B. FIG. 5A shows an exemplary display shown on the combined panel during a period from starting an engine to starting a vehicle, i.e., during an idling period. On the right area 2A of the panel where the EL elements are overlapped on the tachometer of the instrument panel 1, there is shown a message "FASTEN SEAT BELT" on the EL panel while a usual speedometer is shown on the left portion. When this message is first shown it flashes several times and remains lit thereafter. On turning on the EL display, the display of the tachometer which is behind the EL panel is turned off by switching off the illuminating lamp 52 corresponding to the tachometer. In other words, when the EL panel is turned on, the lamp 52 is automatically switched off, and vice versa by a circuitry shown in FIG. 7.

As shown in FIG. 5B, the EL display is turned off and usual instrument panel displays are shown on the panel under a situation when a vehicle is normally driven. Because the EL panel is transparent, all displays behind the EL panel can be clearly seen when the EL panel is turned off.

Figure 6A:
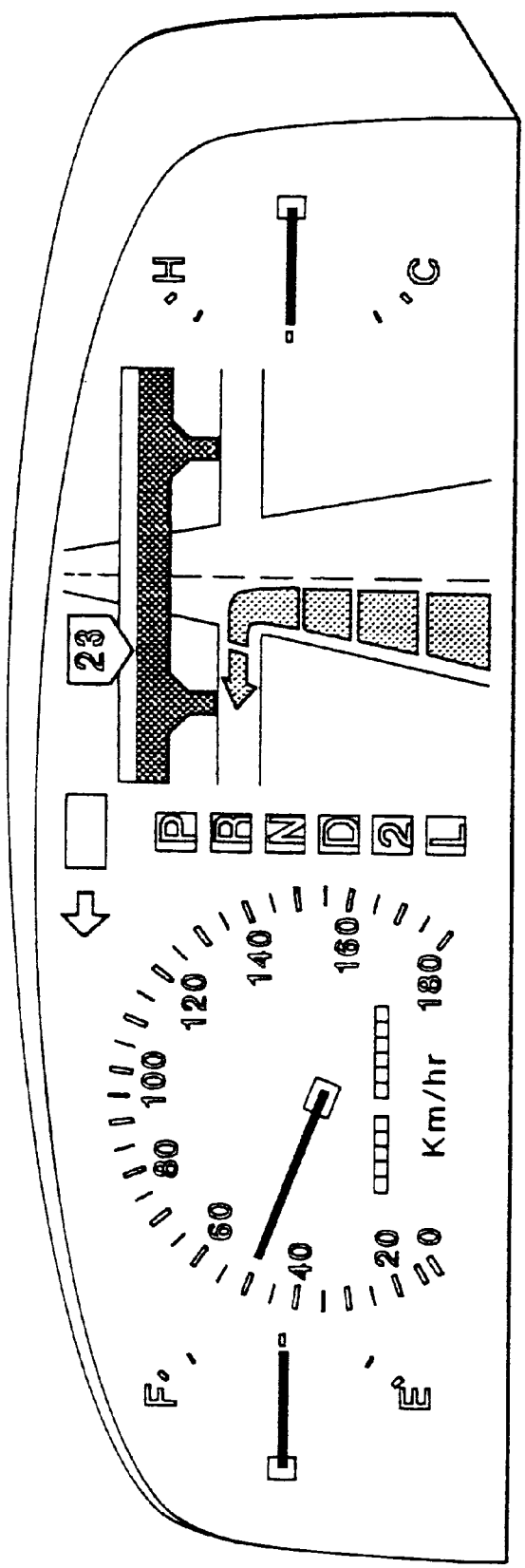
FIG. 6A is a front view of the combined display panel showing images on the panel when a navigation chart is displayed on the front EL panel while a vehicle is being driven.
Figure 6B:
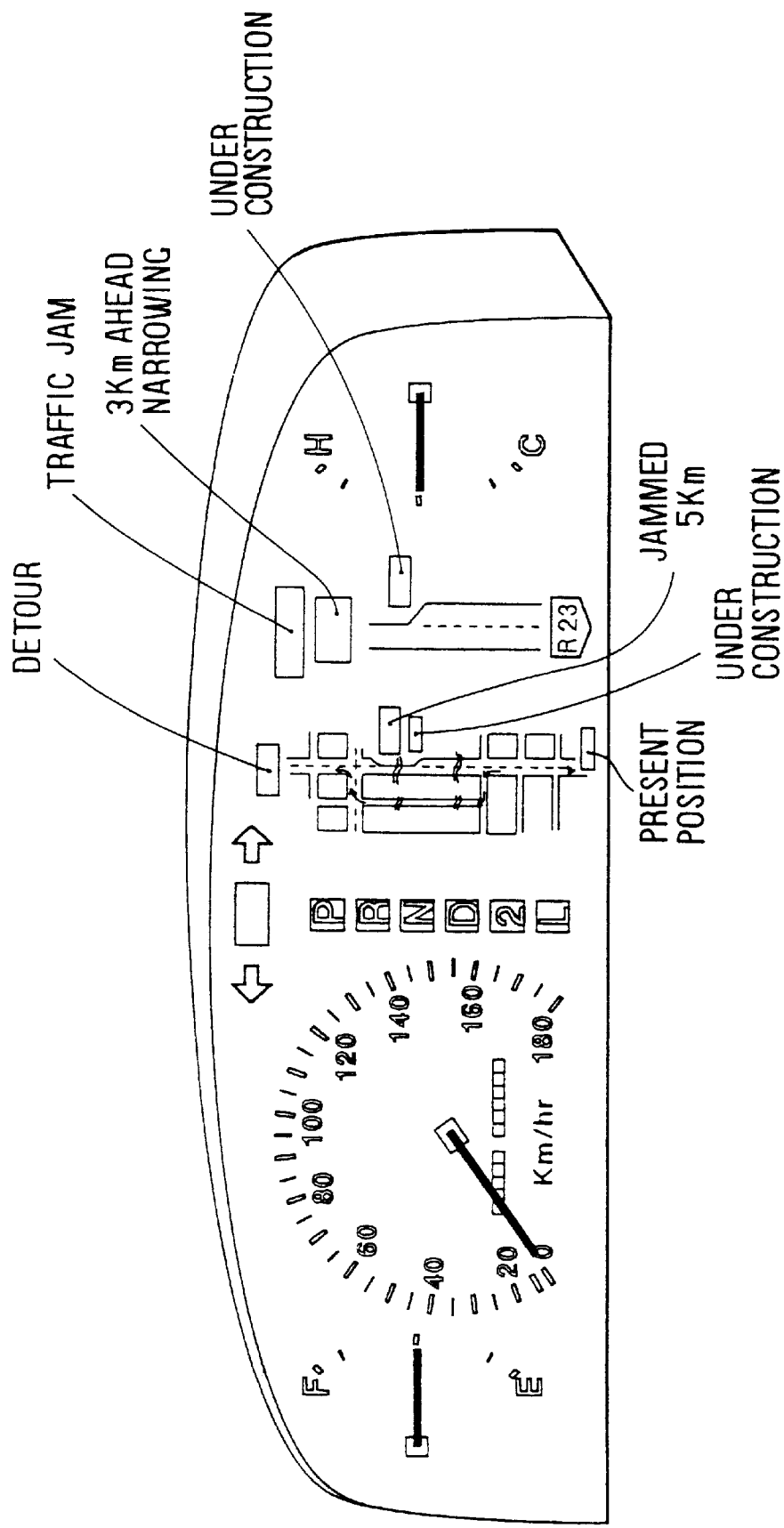
FIG. 6B is a front view of the combined display panel showing images on the panel when a detailed map for navigation is displayed on the front EL panel when a vehicle stops.
Figure 7:
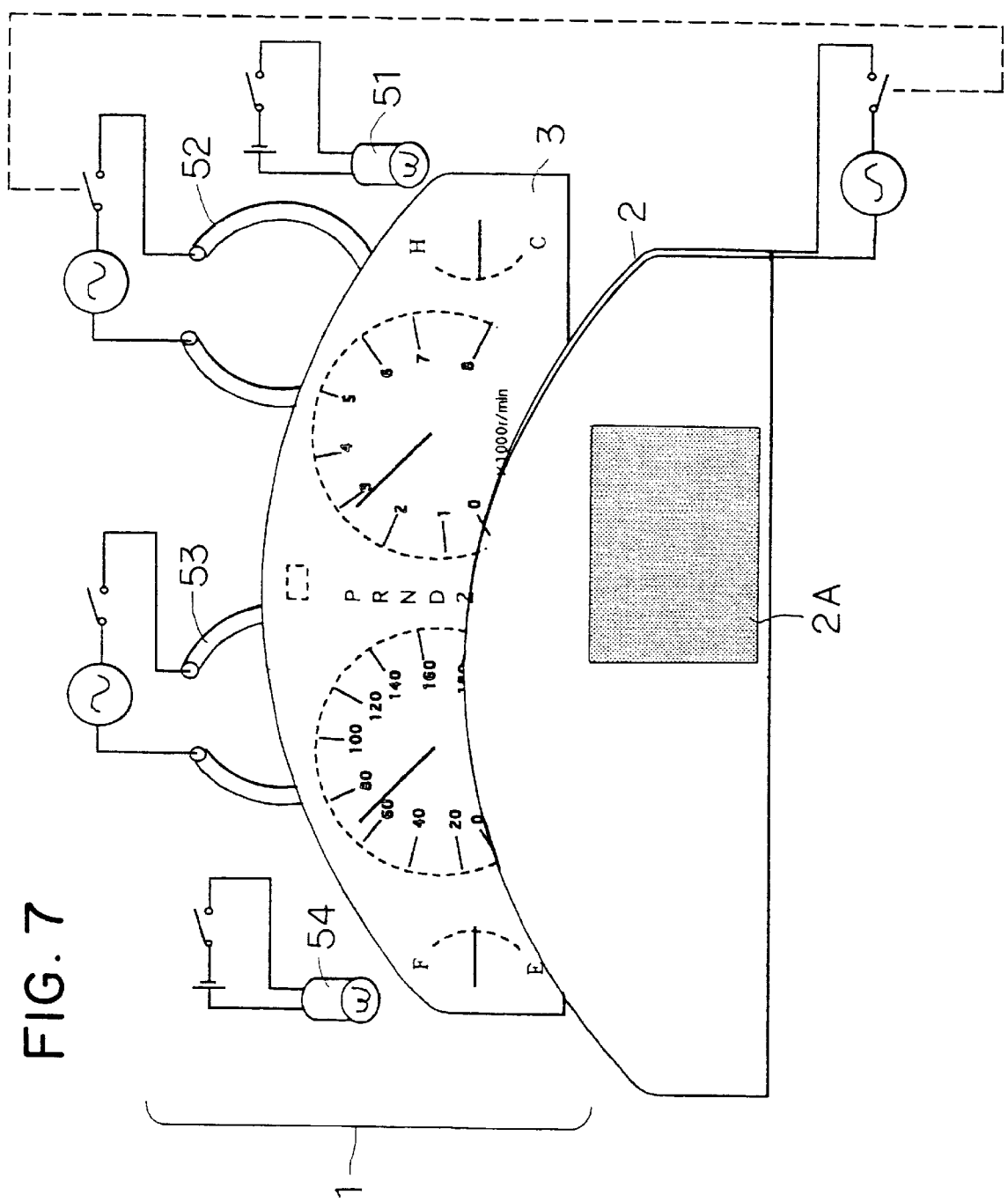
FIG. 7 is a drawing showing illuminating devices combined with the transparent EL panel in the first embodiment of the present invention.

FIG. 6A shows the panel displaying information for navigation on the EL panel at the right area, and a usual speedometer and a fuel gauge at the left area. This display is shown when a driver turns on a navigation system manually, or automatically if such a system is installed, while the vehicle is driven. In this case, considering the situation where the vehicle is being driven, the navigation information is not in detail but in brief. The tachometer display is turned off in this situation too, as in the situation shown in FIG. 5A. On the other hand, when the vehicle stops at an intersection, for example, the navigation information on the EL panel at the right area is automatically switched to a detailed one as shown in FIG. 6B. This switching between the brief information and the detailed information is carried out automatically by such a system installed on the vehicle together with the navigation system.

Under the situations shown in FIGS. 5A, 6A and 6B, where the EL panel is turned on and the tachometer portion of the instrument panel 1 is turned off, light emitted backward from the EL panel and reflected on the back panel, especially on the surfaces of the pointer 42 and the display plate 3, shows undesirable images on the EL panel (the undesirable images will be referred to as reflected images hereafter), if no light attenuator is disposed between the instrument panel 1 and the EL panel 2. The reflected images become especially notable when a fluorescent tube is used as the pointer and when a fluorescent material is coated on the display plate 3. To eliminate the reflected images on the EL panel, the light attenuation filter 7 is disposed just behind the EL panel 2 in the first embodiment of the present invention. The attenuation filter 7 decreases the light intensity incident upon the back panel and the light intensity reflected on the back panel and incident upon the EL panel. Thus, the undesirable reflected images on the combined display panel are eliminated.

Also a halo phenomenon peculiar to the EL device can be suppressed by the attenuation filter 7 which is attached to the back glass plate 27 of the EL panel in this embodiment. The halo phenomenon, which makes vague phantom images on the EL display panel around peripheries of real images by light scattered on surfaces of various layers in the EL panel, can be suppressed by attenuating light intensity reflected on both front and back glass plates 21 and 27 by the attenuation filter 7.

In place of the attenuation filter 7 described above, means for performing the similar function such as a half mirror may be used in the first embodiment. The half mirror reflects light thereon emitted from the EL panel 2 and directed toward the instrument panel 1, while light from the instrument panel 1 toward the EL panel passes therethrough. In this case, however, it has to be noted that there is a problem that the half mirror also reflects light from outside, and adequate counter-measures thereto have to be taken.

A function for preventing reflection may be added to the attenuation filter 7 so that the light from the back panel is not reflected thereon and the images of the back panel (the instrument panel 1) can be clearly seen through the front panel (the EL panel 2), when the EL panel 2 is turned off and the instrument panel 1 is turned on. As an example of the attenuation filter having such a function, a film made by Nippon-Denko under a tradename NPF-AR is available. This film is composed of a protection film made mainly of polyester, a layer for preventing reflection, a hard coated layer, a protection layer, a polarizer, another protection layer and an adhesive layer, all of which are laminated in this order. This film having a transparency of about 38% attenuates the light directing from the front panel to the back panel and prevents reflection of the light directing from the back panel to the front panel.

Figure 8:
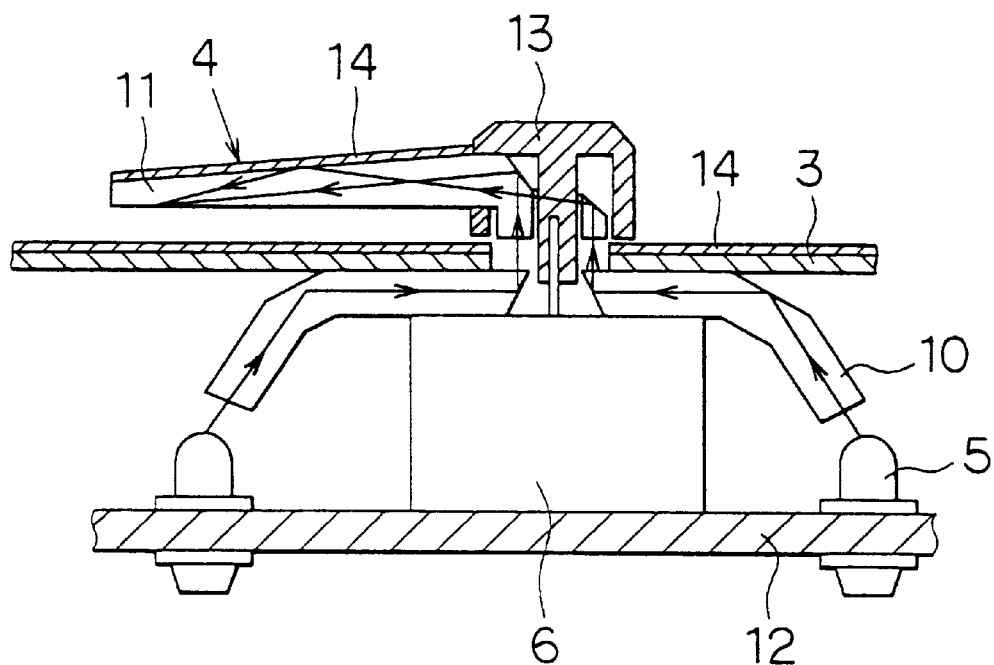
FIG. 8 is a cross-sectional view showing a way of light propagation from lamps to a pointer.
Figure 9:
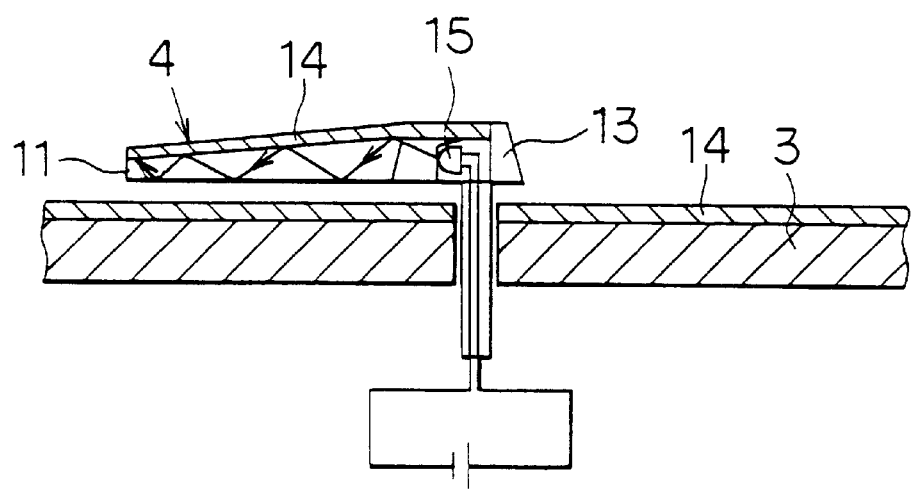
FIG. 9 is a cross-sectional view showing a way of light propagation from a light emitting diode to a pointer.
Figure 10:
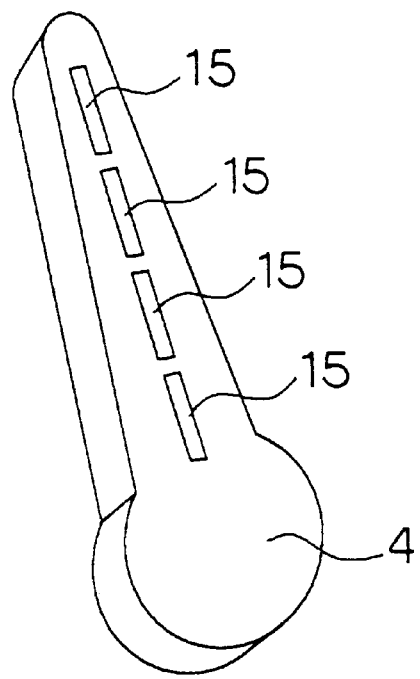
FIG. 10 is a perspective view showing a pointer having light emitting diodes thereon.
Figure 11:
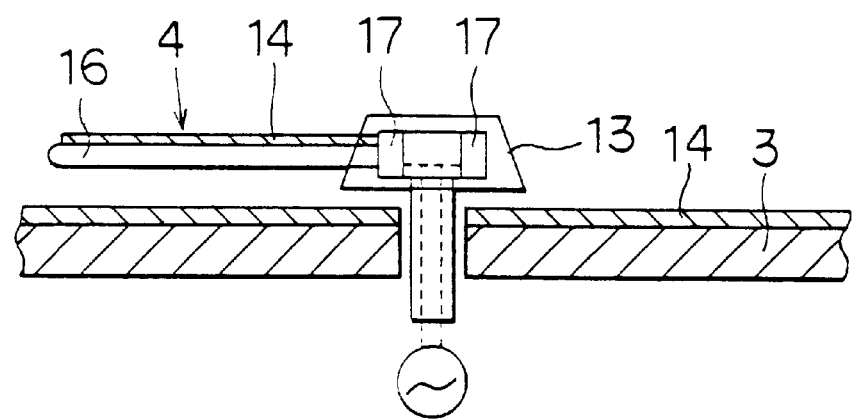
FIG. 11 is a fragmentary cross-sectional view showing a pointer and an illuminator in the display device.

In the foregoing embodiment, self-luminous pointers as shown in FIGS. 8, 9, 10 or 11 are used in the instrument panel 1. The light transmission paths from lamps 5 to a pointer 4 are shown in FIG. 8. Light emitted from a lamp 5 is transmitted through a light path 10 to a pointer 4, making a whole pointer luminous. Incidentally, 12 is a back plate and 13 is a cover. The pointer may be illuminated in a manner shown in FIG. 9. A light emitting diode 15 is installed in the axis of the pointer and the light therefrom is led into the pointer 4 made of light transmissible resin. Also, a plurality of the light emitting diodes 15 may be disposed on the pointer itself as shown in FIG. 10. Further, the pointer may be constructed as shown in FIG. 11, in which the pointer is a fluorescent tube itself. In this case electrodes 17 for the fluorescent tube are installed in the center axis of the pointer. As shown in FIGS. 8, 9 and 11, a film 14 for preventing reflection may be attached on the surfaces of the pointer 4 and the display plate 3, so that the reflected images can be further weakened in addition to the effect of the attenuation filter 7. As the film 14, for example, the film NPF-AR mentioned above may be used. The light reflection on the surface of the pointer may be reduced also by forming bumps and depressions thereon.

(Second Embodiment)

Referring to FIGS. 12 and 13, a second embodiment will be described. In the second embodiment, the light attenuator for preventing the reflected images is included in the transparent EL panel itself. FIG. 12 shows an EL panel which includes a light absorbing film 71 formed on the back glass plate 27. Structures other than the light absorbing film 71 are the same as those of the EL panel shown in FIG. 4. The light absorbing film 71 is made of a material having a high light absorbing characteristic such as tantalum sulfide. The reflected images can be effectively suppressed by using the transparent EL panel thus made even when the EL panel 2 is disposed closely to the instrument panel 1. The halo phenomenon mentioned above is also effectively prevented by the EL panel of the second embodiment. In addition, a whole size of the combined display panel can be made smaller.

Figure 14:
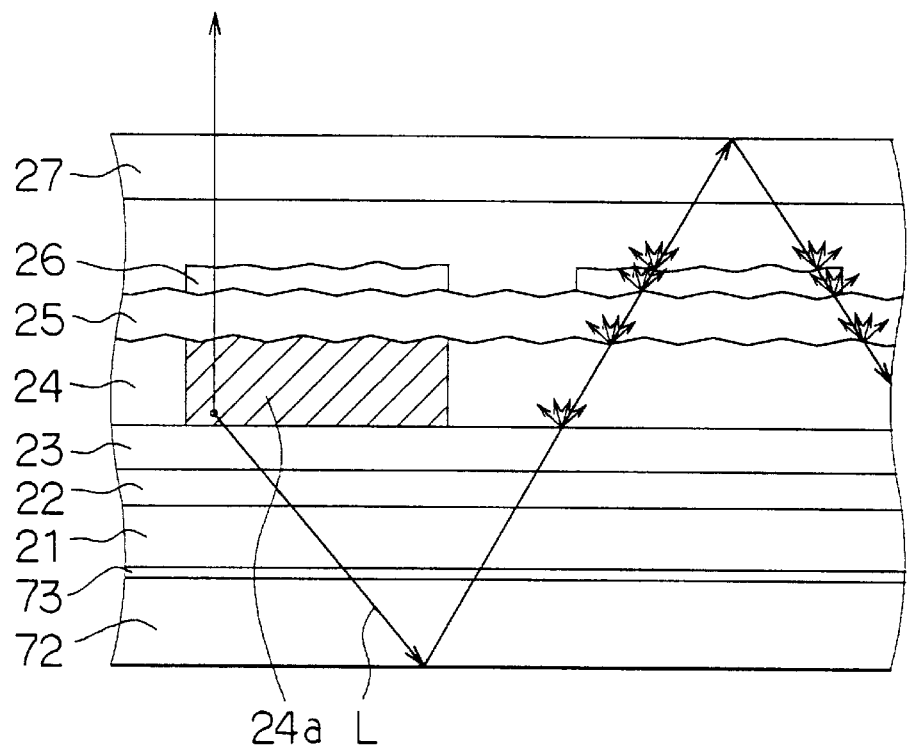
FIG. 14 is a schematic drawing explaining a halo phenomenon in the transparent EL panel.

The EL panel may be made in a form as shown in FIG. 13 in which an attenuation filter 72 is attached to the front glass plate 21 by an adhesive 73. In this case, the EL panel 2 is assembled to the back panel so that the back glass panel 27 faces the front side. The adhesive 73 has the same refractive index as the front glass plate 21 and the attenuation filter 72 in order to further reduce the halo phenomenon. As shown in FIG. 14, when refractive indices of the glass plate 21, the adhesive 73 and the attenuation filter 72 are the same, the light L emitted from a region 24a of the luminescent layer 24 proceeds straight to the attenuation filter 72 without being reflected on the glass plate 21, and is attenuated in the attenuation filter 72 and then reflected thereon. Because of this, the halo caused by scattering on surfaces of transparent EL element layers is reduced.

(Third Embodiment)

Figure 15:
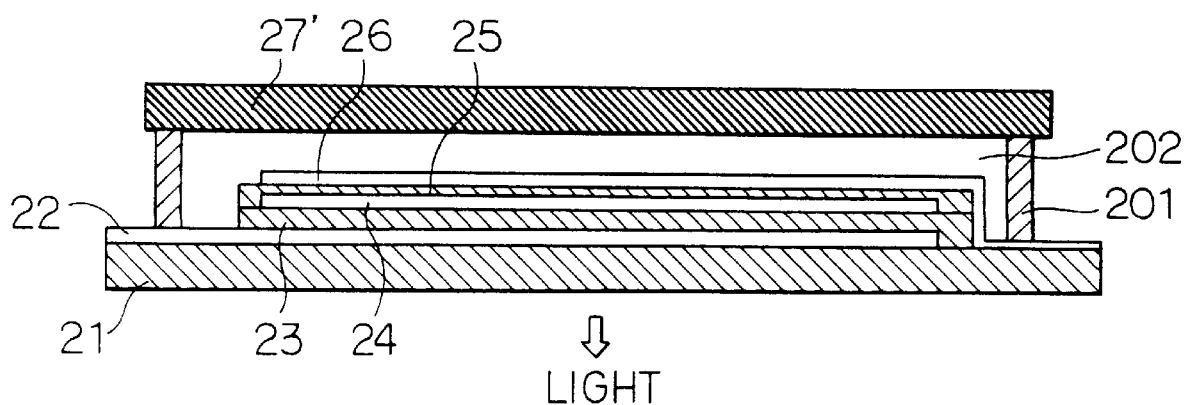
FIG. 15 is a cross-sectional view showing a transparent EL panel used in a third embodiment of the present invention.
Figure 16:
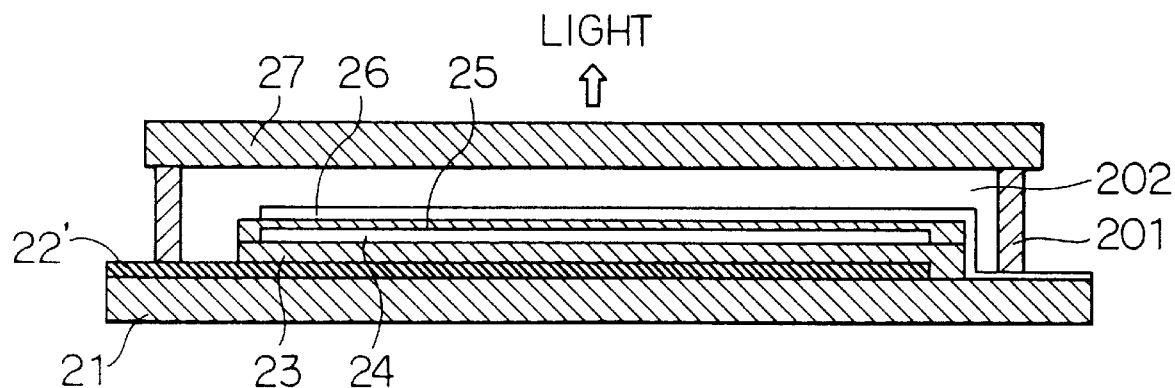
FIG. 16 is a cross-sectional view showing another transparent EL panel used in the third embodiment of the present invention.

Referring to FIGS. 15 and 16, a third embodiment of the present invention will be described. In this embodiment, the transparent EL panel 2 is constructed so that a component itself includes the light attenuator function for suppressing the reflected images. The halo phenomenon is also suppressed in this construction. A transparent EL panel shown in FIG. 15 has a back glass plate 27' made of a material having light attenuation characteristics such as smoked glass or colored glass. Other structures are the same as those of the EL panel shown in FIG. 4. The EL panel 2 thus made is assembled to the back panel so that the glass plate 21 faces the front side.

Another example of the EL panel is shown in FIG. 16, in which the first transparent electrodes 22 is replaced by a first transparent electrodes 22' having a light absorbing function. It is also possible to replace the first insulating layer 23 or the second insulating layer 25 with a layer having a light absorbing function. The EL panel 2 shown in FIG. 16 is assembled to the back panel so that the glass plate 27 faces the front side.

The reflected images and the halo phenomenon are effectively suppressed or reduced in the third embodiment. In addition, it is also possible to give the light absorbing function to the first transparent electrodes 22' by making them thicker in the EL panel shown in FIG. 16, because the material constituting the electrodes 22' such as ITO or ZnO has the light absorbing characteristics in itself. For example, the electrodes 22' may be made with a thickness of 600~1200 nm and the electrodes 26 with a thickness of 150~300 nm. In this case, electric resistance of the electrodes 22' is reduced. The EL panel having the thicker electrodes 22' may be driven in a matrix fashion, and the thicker electrodes 22' may be placed to run horizontally (i.e., using the thicker electrodes as scanning electrodes) and the thinner electrodes 26 are placed to run vertically (i.e., using the thinner electrodes as data electrodes) on the display panel, the quality of the display is enhanced because uniformity of luminance is not adversely affected by the electric resistance of the horizontal electrodes.

(Fourth Embodiment)

Figure 17:
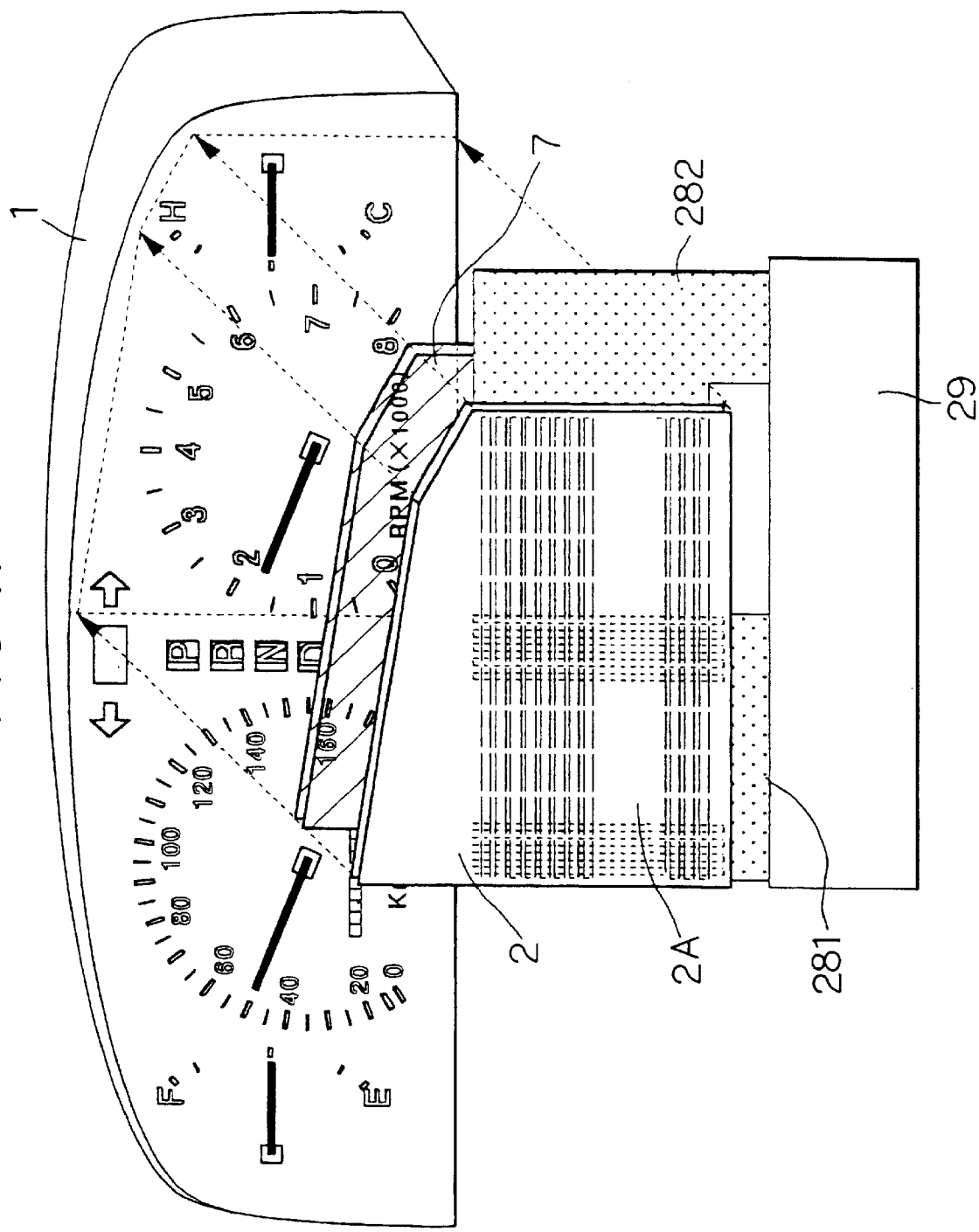
FIG. 17 is a schematic drawing showing a combined display panel including an attenuation filter and a transparent EL panel, as a fourth embodiment according to the present invention.
Figure 18:
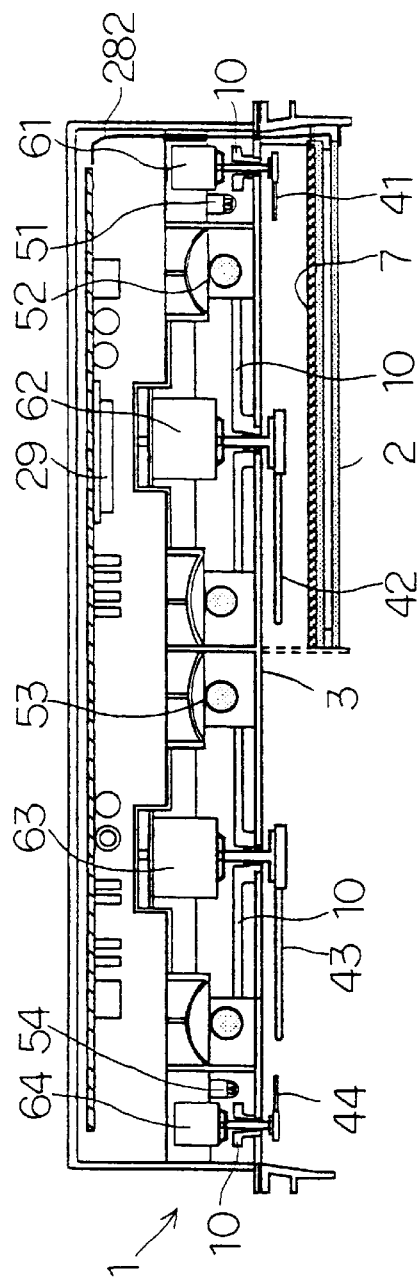
FIG. 18 is a cross-sectional view of the combined display panel viewed from the top of FIG. 17.

A fourth embodiment of the present invention is shown in FIGS. 17 and 18. In this embodiment, the EL panel 2 and the light attenuation filter 7 are made smaller, compared with the foregoing embodiments, to cover only a right half of the instrument panel 1 as shown in the drawings. It is also possible to make only the front glass plate of the EL panel 2 to cover a whole surface of the instrument panel 1. The operation of the combined display panel and other structures are the same as those of the foregoing embodiments. The fourth embodiment can be made at a lower cost because the EL panel and the attenuation filter are smaller.

(Fifth Embodiment)

Figure 21:
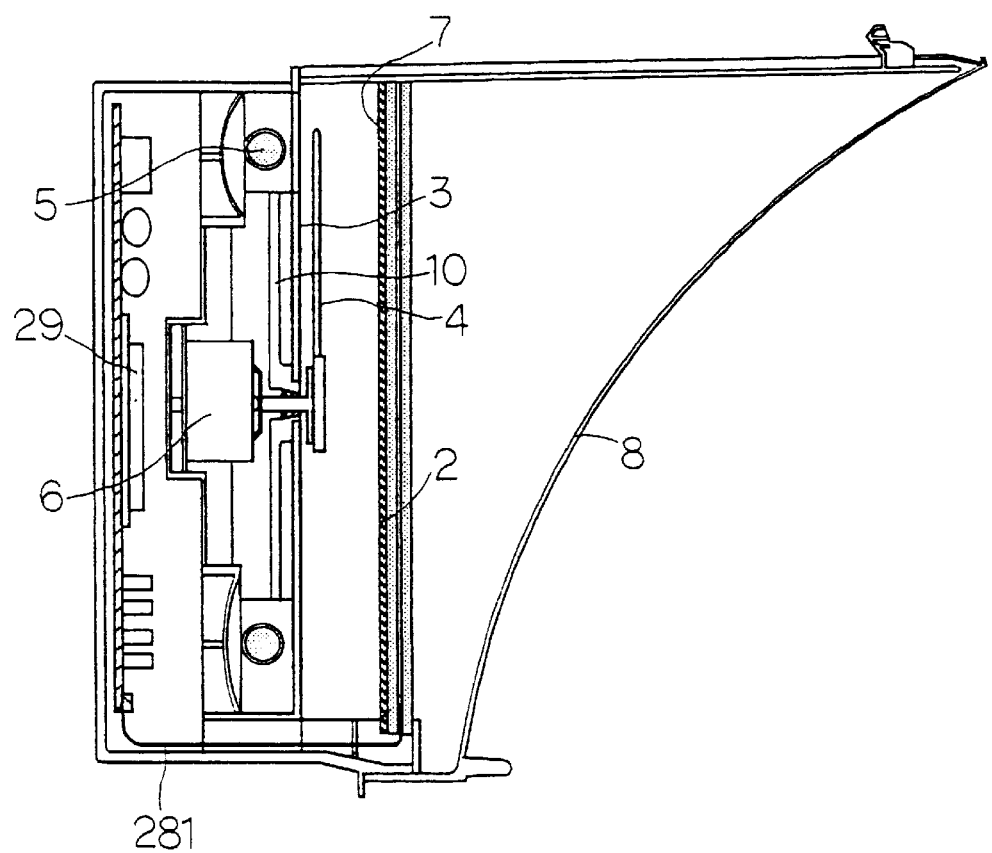
FIG. 21 is a side cross-sectional view of the combined display panel shown in FIG. 20.
Figure 20:
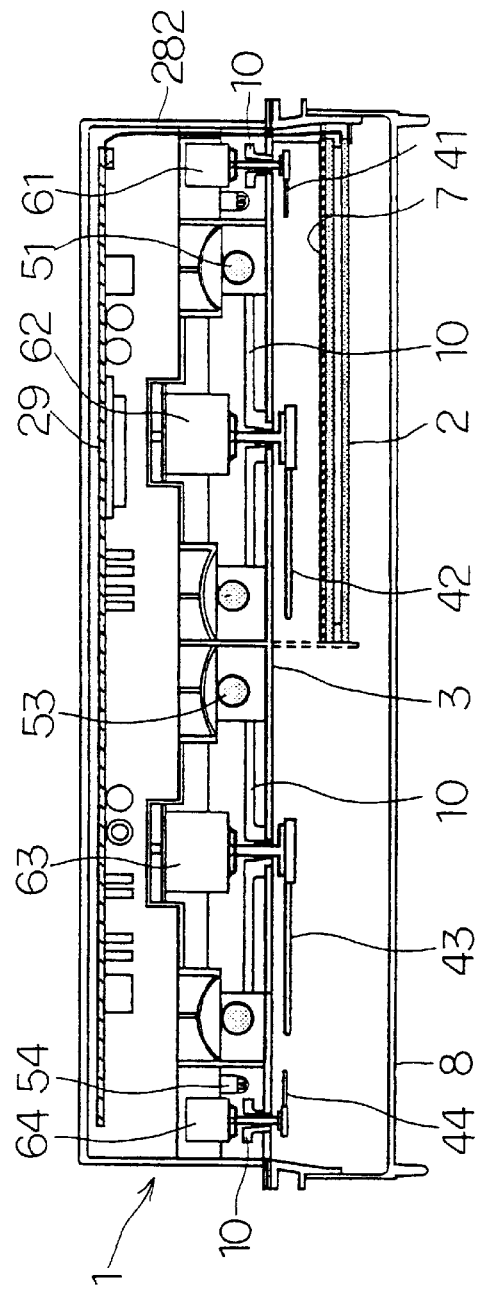
FIG. 20 is a cross-sectional view of a combined display panel as a fifth embodiment according to the present invention.
Figure 19:
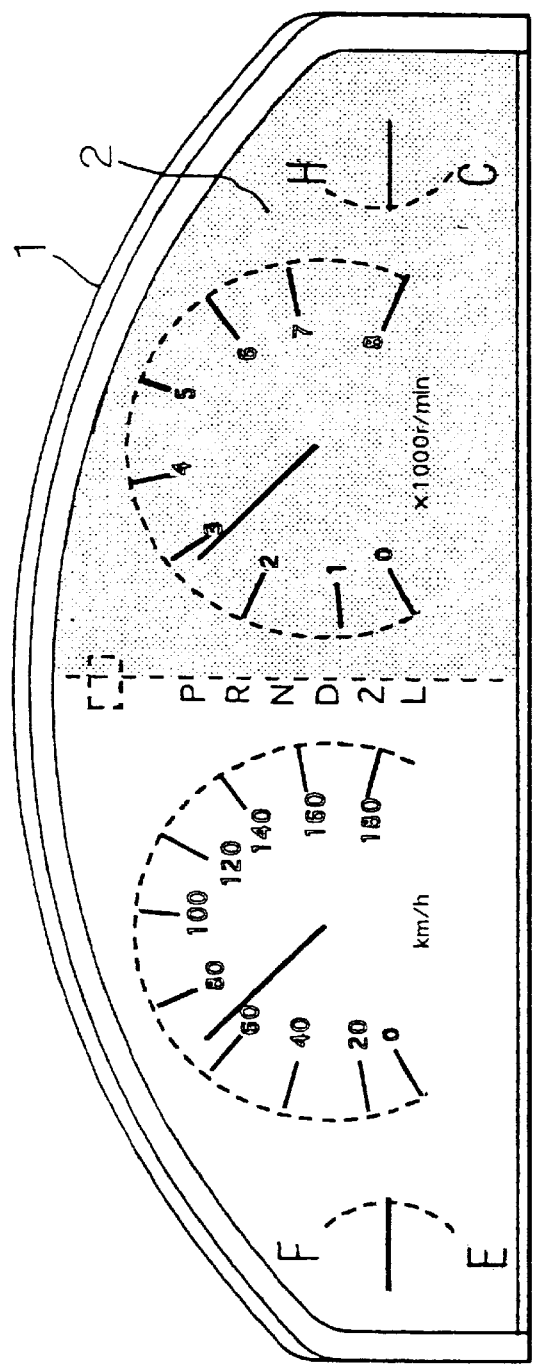
FIG. 19 is a front view of the combined display panel showing a luminance imbalance between the right and left sections in the fourth embodiment.

Referring to FIGS. 20, 21, 22A and 22B, a fifth embodiment according to the present invention will be described. In the fourth embodiment, there exists a luminance imbalance on the combined display panel between the right area where the attenuation filter 7 is disposed and the left area where no attenuation filter is disposed as shown in FIG. 19, when the EL panel is turned off and the instrument panel is lit. In the fifth embodiment, a dimming filter 8, for example, a smoked glass plate, is disposed so as to cover a whole front surface of the combined display panel. It is provided in addition to the structure of the fourth embodiment to improve the appearance of the combined display panel. The dimming filter 8 covers a whole surface of the combined display panel as shown in FIG. 20, and its shape viewed from the side of the combined display panel is shown in FIG. 21. Since the dimming filter 8 decreases the luminance of the combined display panel throughout its whole front surface, the luminance difference between the right and left areas becomes less notable. The appearance of the combined display panel is further improved because the existence of the EL panel itself becomes less visible from the front side. In addition, by further decreasing the transparency of the dimming filter 8, it is possible to make the combined display panel look very dark when all the displays are turned off, and to make displays come out from darkness when they are turned on. This kind of instrument panel is a so called black-out instrument.

Figure 22A:
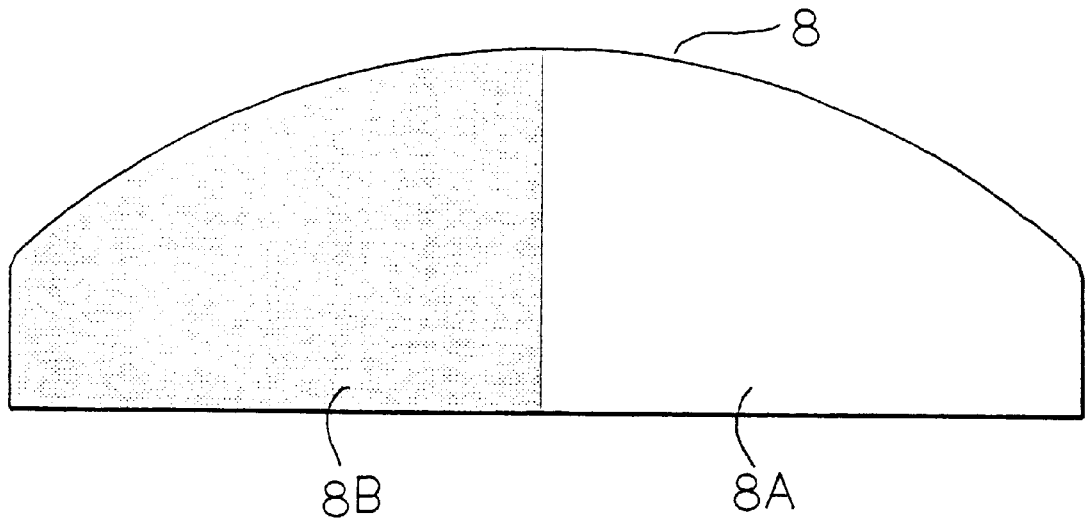
FIG. 22A shows a dimming filter used in the fifth embodiment.
Figure 22B:
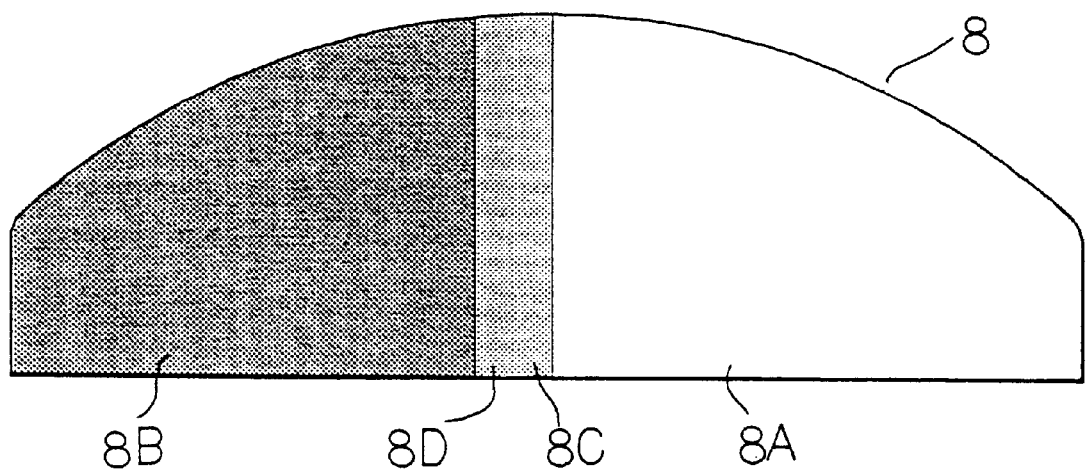
FIG. 22B shows another dimming filter used in the fifth embodiment.

The dimming filter 8 may be made as shown in FIGS. 22A and 22B. The dimming filter shown in FIG. 22A has different transparencies on the right area 8A where the EL panel 2 and the attenuation filter 7 are overlapped on the instrument panel 1 and on the left area 8B where nothing is overlapped. Since the transparency on the right area 8A is higher than that on the left area 8B, the dimming filter 8 compensates the luminance imbalance, and accordingly the whole surface of the combined display panel has a substantially uniform luminance. For example, assuming the transparency of the EL panel 2 is 80% and that of the attenuation filter 7 is 38%, the transparencies of the dimming filter 8 are made 33% on the right area 8A and 10% on the left area 8B. By placing the dimming filter 8 like this to cover the whole surface of the combined display panel, an overall transparency of the combined display panel can be made equal on both right and left areas (a transparency of the right area= 0.8×0.38×0.33×100=10%, a transparency of the left area= 10%).

FIG. 22B shows another example of the dimming filter 8, in which areas 8C and 8D each having an intermediate transparency are made between the areas 8A and 8B. For example, transparencies of areas 8A, 8C, 8D and 8B are made 33%, 25%, 17% and 10%, respectively. Alternatively, the transparency of the areas 8C and 8D may be changed continuously. The dimming filter 8 thus made eliminates the overall luminance imbalance on the combined display panel and improves the appearance of the panel, as well.

(Sixth Embodiment)

Figure 23:
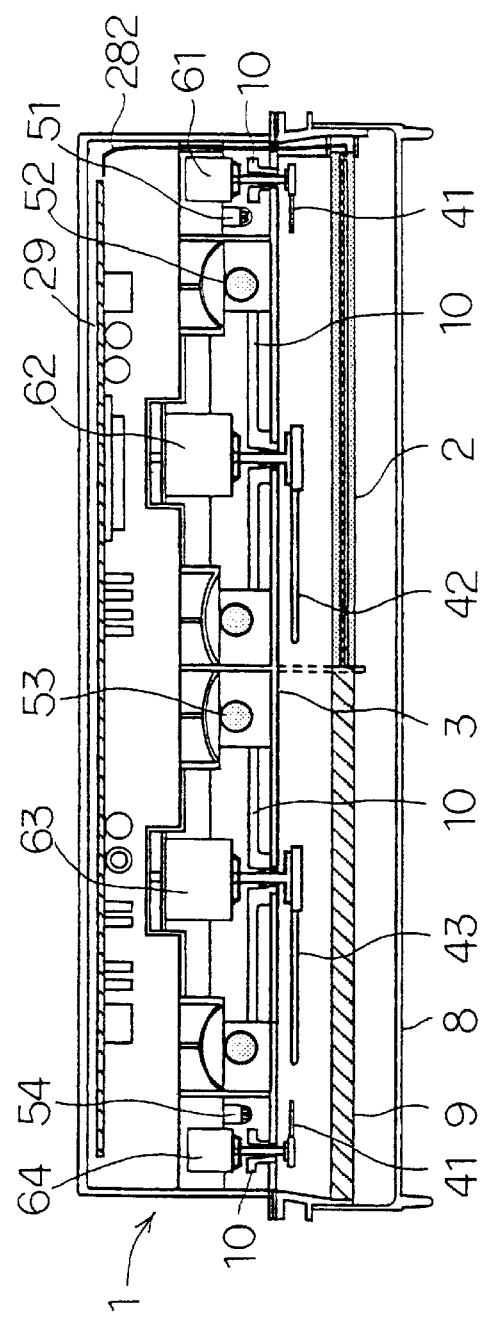
FIG. 23 is a cross-sectional view of a combined display panel as a sixth embodiment according to the present invention.

A sixth embodiment according to the present invention is shown in FIG. 23. An EL display panel 2 which includes therein a light attenuator for suppressing the reflected images as in the second and third embodiments is disposed to cover the right half surface of the instrument panel 1. A transparency adjustment filter 9 having a transparency that equalizes an overall luminance of the combined display panel on its right half surface and the left half surface is disposed to cover the left half surface of the instrument panel 1. In other words, the transparency of the transparency adjustment filter 9 is made the same as that of the EL panel 2 when the back light brightness is uniform, and its transparency is so selected that the overall luminance of the combined panel becomes uniform throughout its entire surface when the back light brightness is not uniform. The transparency adjustment filter 9 may be made of any material as far as it has such a transparency mentioned above, but preferably an inexpensive material such as acrylic resin. Both of the EL panel 2 and the transparency adjustment filter 9 are placed at the same surface level so that all displays of the combined panel can be seen clearly with a wide viewing angle. A dimming filter 8 having a uniform transparency is disposed to cover both surfaces of the EL panel 2 and the transparency adjustment filter 9. The combined display panel of the sixth embodiment is able to suppress the reflected images and eliminate the luminance imbalance between the right and left areas.

(Seventh Embodiment)

Figure 24:
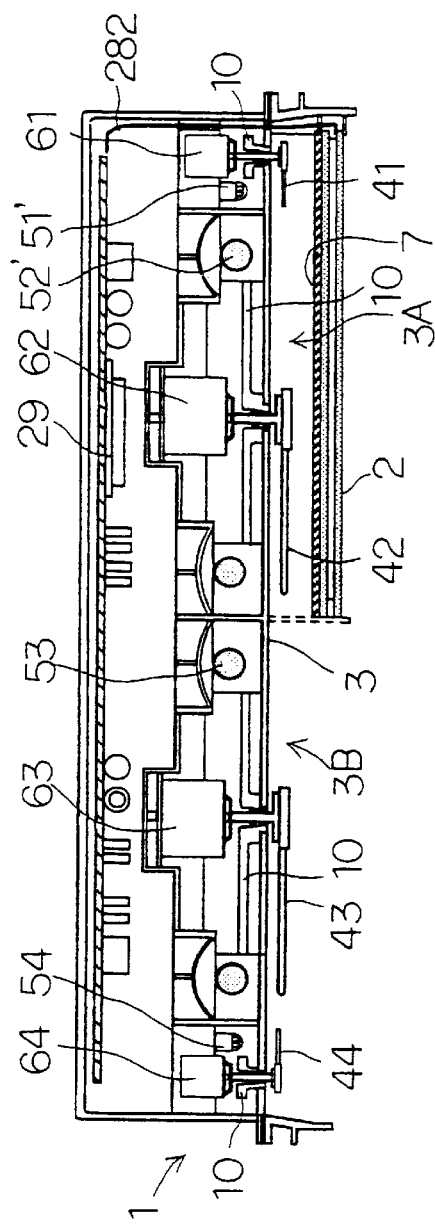
FIG. 24 is a cross-sectional view of a combined display panel as a seventh embodiment according to the present invention.
Figure 25:
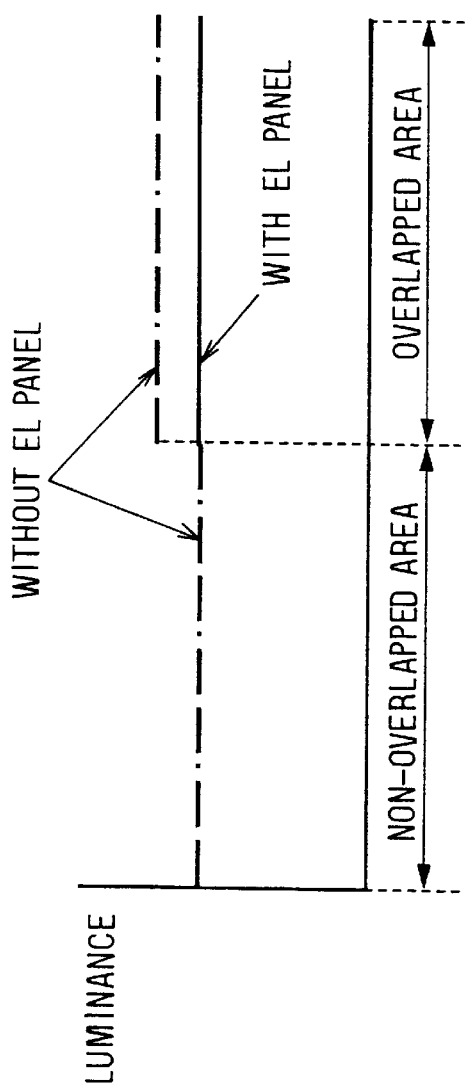
FIG. 25 is a graph showing luminance comparison between two areas on the combined display panel of the seventh embodiment.
Figure 26:
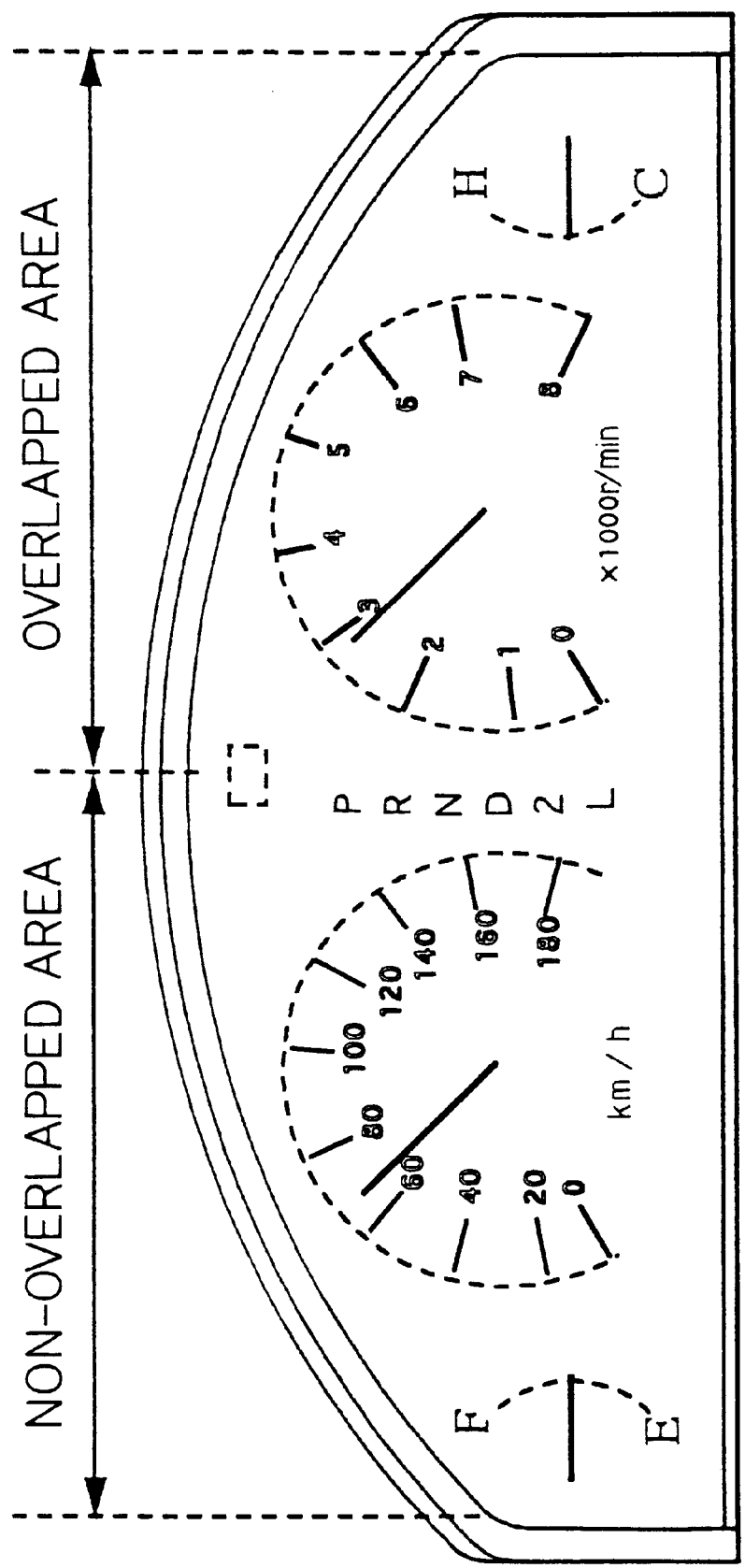
FIG. 26 is a front view of the combined display panel of the seventh embodiment.

A seventh embodiment is shown in FIG. 24, in which the luminance of the back light of the instrument panel 1 is adjusted so that the overall luminance on the combined display panel becomes uniform throughout its entire surface. On the right half surface of the instrument panel 1, there are disposed the light attenuation filter 7 for eliminating the reflected images and the EL panel 2 which is the same as that used in the fourth embodiment. Illuminating lamps 51' and 52' corresponding to the right half of the combined panel are made brighter than those lamps 53 and 54 corresponding to the left half so that the brightness of the back lamps compensates the transparency decrease due to the attenuation filter 7 and the EL panel 2. The luminance of the back lamps is adjusted so that the luminance is stepwise as shown by a dotted line in FIG. 25, when the EL panel does not cover the right half surface. When the EL panel covers the right half surface, the overall luminance of the combined display panel becomes uniform as shown by a solid line in FIG. 25. In addition, the luminance of the back lamps may be controlled manually or automatically in accordance with levels of outside brightness, e.g., the luminance of the back lamps is made higher in day time and lower at night time. In this case, the luminance is controlled as a whole while keeping the luminance difference in the same ratio between the right and left areas of the combined display panel in order to avoid luminance imbalance on the panel.

(Common To Embodiments)

Either one of the types of the EL panel disclosed above, whether or not it includes the light attenuator therein, can be used in one of the fifth, sixth or seventh embodiments together with a proper combination with other components. Though fluorescent lamps and incandescent lamps are shown as the illuminating lamps in the foregoing embodiments, some other illuminating devices including light emitting diodes may be used as far as they are electrically driven and the luminance thereof can be controlled.

The EL panel may be combined with, to construct a combined display panel, not only mechanical analog meters but various kinds of instrument panels including liquid crystal panels having a back light and self-luminous digital meters using vacuum fluorescent lamps. Though the combined display panels are described to be used in an automobile vehicle, they can be used, of course, for many other purposes. It is also possible to display images on both instrument panel 1 and the EL panel 2 at the same time, though the displays on both panels are selectively switched in the foregoing embodiments described above.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A combined display panel comprising:
    an instrument panel comprising a switchable illumination mechanism;
    an overlapping panel comprising a transparent electroluminescent display panel disposed in front of and overlapping at least part of said instrument panel, said instrument panel and said overlapping panel each comprising an overlapped part and a non-overlapped part, said overlapped part of said instrument panel and said overlapped part of said overlapping panel being adapted to be alternately or concurrently displayed, wherein said illumination mechanism is switchable in accordance with a selection of an image to be displayed by said overlapped part;
    a light attenuator having a predetermined constant attenuation factor, for decreasing an intensity of light emitted from said electroluminescent display panel toward said instrument panel, said light attenuator being disposed between said instrument panel and said overlapping panel; and a selective switching mechanism for selectively switching between displaying said overlapped part of said instrument panel, displaying said overlapped part of said overlapping panel, and concurrently displaying both said overlapped part of said instrument panel and said overlapped part of said overlapping panel.

2. The combined display panel according to claim 1, wherein said light attenuator comprises one of a flat plate or a film.

3. The combined display panel according to claim 1, wherein said instrument panel comprises a surface, said surface comprising portions reflecting light emitted from said overlapped part of said electroluminescent display panel and comprising a film disposed on said surface for preventing light reflection.

4. The combined display according to claim 1, wherein said instrument panel comprises luminance pointers turned on or off when said overlapped part of said instrument panel or said overlapped part of said overlapping panel, respectively, is selectively switched to be displayed.

5. The combined display according to claim 1, further comprising a dimming filter disposed to cover a whole front surface of said combined display panel.

6. The combined display panel according to claim 5, wherein said dimming filter comprises a first portion covering said overlapped parts of said instrument panel and said overlapping panel, and a second portion covering said non-overlapped parts of said instrument panel and said overlapping panel, said first portion having a higher transparency than said second portion so that a luminance imbalance between said overlapped parts and said non-overlapped parts is suppressed.

7. The combined display panel according to claim 1, further comprising a transparency adjustment filter for substantially eliminating an overall luminance imbalance between said overlapped and said non-overlapped parts of said instrument panel and said overlapping panel, said transparency adjustment filter being disposed in front of said instrument panel and covering said non-overlapped parts of said instrument panel and of said overlapping panel.

8. The combined display panel according to claim 7, wherein transparencies of said transparency adjustment filter and said electroluminescent display panel are substantially equal.

9. The combined display panel according to claim 7, wherein said transparency adjustment filter and said electroluminescent display panel are disposed at a same surface level in relation to said instrument panel.

10. The combined display panel according to claim 1, wherein said instrument panel comprises a back light for illuminating said instrument panel, a brightness of said backlight being higher for said overlapped part of said instrument panel than a brightness of said backlight for said non-overlapped part of said instrument panel, so that an overall luminance of said combined display panel is equalized throughout an entire surface of said combined display panel.

11. The combined display panel according to claim 1, wherein said instrument panel comprises a back light for laminating said instrument panel, a brightness of said backlight being higher for said overlapped part of said instrument panel than a brightness of said backlight for said non-overlapped part of said instrument panel, so that an overall luminance of said combined display panel is equalized throughout an entire surface of said combined display panel.

12. The display panel according to claim 1, wherein said instrument panel comprises a display plate and pointers illuminated by said switchable illumination mechanism, wherein an illumination of said display plate and said pointers is turned on or off in accordance with turning on or off of the illumination of said instrument panel.

13. The display panel according to claim 1, wherein said instrument panel comprises a display plate and pointers, wherein said pointer comprises a self-illuminating mechanism therein, and wherein said self-illuminating mechanism is turned on or off in accordance with turning on or off of the illumination of said instrument panel.

14. A combined display panel comprising:
an instrument panel comprising a switchable illumination mechanism;
an overlapping panel comprising a transparent electroluminescent display panel disposed in front of and overlapping at least part of said instrument panel, said instrument panel and said overlapping panel each comprising an overlapped part and a non-overlapped part, said overlapped part of said instrument panel and said overlapped part of said overlapping panel being adapted to be alternately or concurrently displayed, said transparent electroluminescent display panel comprising a light attenuator built as an integral part of said electroluminescent display panel, said light attenuator decreasing an intensity of light emitted from said electroluminescent display panel toward said instrument panel.

15. The combined display panel according to claim 14, wherein said instrument panel comprises a switchable illumination mechanism, wherein said switchable illumination mechanism is switchable in accordance with a selection of an image to be displayed by said overlapped part, and wherein said combined display panel further comprises a selective switching mechanism for selectively switching between displaying said overlapped part of said instrument panel, displaying said overlapped part of said overlapping panel, and concurrently displaying both said overlapped part of said instrument panel and said overlapped part of said overlapping panel.

16. The display panel according to claim 15, wherein said instrument panel comprises a display plate and pointers illuminated by said switchable illumination mechanism, wherein an illumination of said display plate and said pointers is turned on or off in accordance with turning on or off of the illumination of said instrument panel.

17. The display panel according to claim 15, wherein said instrument panel comprises a display plate and pointers, wherein said pointer comprises a self-illuminating mechanism therein, and wherein said self-illuminating mechanism is turned on or off in accordance with turning on or off of the illumination of said instrument panel.

18. The combined display panel according to claim 14, wherein said electroluminescent display panel comprises two transparent substrates and a luminescent layer disposed between said two transparent substrates, one of said two transparent substrates comprising an outer surface, and wherein said light attenuator comprises a light attenuation filter attached to said outer surface of said one transparent substrate and facing said instrument panel.

19. The combined display panel according to claim 18, wherein said light attenuation filter is attached to said one transparent substrate with an adhesive having a refractive index substantially equal to a refractive index of said one transparent substrate and a refractive index of said light attenuation filter.

20. The combined display panel according to claim 14, wherein said electroluminescent display panel comprises two transparent substrates and a luminescent layer disposed between said two transparent substrates, one of said two transparent substrates comprising an inner surface, and wherein said light attenuator comprises a light absorbing film disposed on said inner surface of said one transparent substrate and facing said instrument panel.

21. The combined display panel according to claim 20, wherein said instrument panel comprises a back light for laminating said instrument panel, a brightness of said backlight being higher for said overlapped part of said instrument panel than a brightness of said backlight for said non-overlapped part of said instrument panel, so that an overall luminance of said combined display panel is equalized throughout an entire surface of said combined display panel.

22. The combined display panel according to claim 14, wherein said instrument panel comprises a surface, said surface comprising portions reflecting light emitted from said overlapped part of said electroluminescent display panel and comprising a film disposed on said surface for preventing light reflection.

23. The combined display according to claim 14, wherein said instrument panel comprises luminance pointers turned on or off when said overlapped part of said instrument panel or said overlapped part of said overlapping panel, respectively, is selectively switched to be displayed.

24. The combined display according to claim 14, further comprising a dimming filter disposed to cover a whole front surface of said combined display panel.

25. The combined display panel according to claim 24, wherein said dimming filter comprises a first portion covering said overlapped parts of said instrument panel and said overlapping panel, and a second portion covering said non-overlapped parts of said instrument panel and said overlapping panel, said first portion having a higher transparency than said second portion so that a luminance imbalance between said overlapped parts and said non-overlapped parts is suppressed.

26. The combined display panel according to claim 14, further comprising a transparency adjustment filter for substantially eliminating an overall luminance imbalance between said overlapped and said non-overlapped parts of said instrument panel and said overlapping panel, said transparency adjustment filter being disposed in front of said instrument panel and covering said non-overlapped parts of said instrument panel and of said overlapping panel.

27. The combined display panel according to claim 26, wherein transparencies of said transparency adjustment filter and said electroluminescent display panel are substantially equal.

28. The combined display panel according to claim 26, wherein said transparency adjustment filter and said electroluminescent display panel are disposed at a same surface level in relation to said instrument panel.

29. A combined display panel comprising:
an instrument panel comprising a switchable illumination mechanism;
an overlapping panel comprising a transparent electroluminescent display panel disposed in front of and overlapping at least part of said instrument panel, said instrument panel and said overlapping panel each comprising an overlapped part and a non-overlapped part, said overlapped part of said instrument panel and said overlapped part of said overlapping panel being adapted to be alternately or concurrently displayed, wherein said illumination mechanism is switchable in accordance with a selection of an image to be displayed by said overlapped part; and a selective switching mechanism for selectively switching between displaying said overlapped part of said instrument panel, displaying said overlapped part of said overlapping panel, and concurrently displaying both said overlapped part of said instrument panel and said overlapped part of said overlapping panel;
said transparent electroluminescent display panel comprising a luminescent layer, a pair of insulating layers disposed on respective surfaces of said luminescent layer, a pair of electrode layers disposed on respective surfaces of said insulating layers, and a pair of substrates sandwiching said luminescent layer, said pair of insulating layers, and said pair of electrode layers;
at least one of said luminescent layer, said insulating layers, said electrode layers, and said substrates facing said instrument panel when said transparent electroluminescent display panel overlaps said instrument panel and constituting a light attenuator for decreasing an intensity of light emitted from said luminescent layer toward said instrument panel.

30. The combined display panel according to claim 29, wherein said instrument panel comprises a surface, said surface comprising portions reflecting light emitted from said overlapped part of said electroluminescent display panel and comprising a film disposed on said surface for preventing light reflection.

31. The combined display according to claim 29, wherein said instrument panel comprises luminance pointers turned on or off when said overlapped part of said instrument panel or said overlapped part of said overlapping panel, respectively, is selectively switched to be displayed.

32. The combined display according to claim 29, further comprising a dimming filter disposed to cover a whole front surface of said combined display panel.

33. The combined display panel according to claim 32, wherein said dimming filter comprises a first portion covering said overlapped parts of said instrument panel and said overlapping panel, and a second portion covering said non-overlapped parts of said instrument panel and said overlapping panel, said first portion having a higher transparency than said second portion so that a luminance imbalance between said overlapped parts and said non-overlapped parts is suppressed.

34. The combined display panel according to claim 29, further comprising a transparency adjustment filter for substantially eliminating an overall luminance imbalance between said overlapped and said non-overlapped parts of said instrument panel and said overlapping panel, said transparency adjustment filter being disposed in front of said instrument panel and covering said non-overlapped parts of said instrument panel and of said overlapping panel.

35. The combined display panel according to claim 34, wherein transparencies of said transparency adjustment filter and said electroluminescent display panel are substantially equal.

36. The combined display panel according to claim 34, wherein transparencies of adjustment filter and said electroluminescent display panel are disposed at a same surface level in relation to said instrument panel.

37. A display panel assembly disposed in a field of view of a driver of an automobile, said display panel assembly comprising:
an instrument panel comprising a switchable illumination mechanism;
an interposed display panel comprising a transparent electroluminescent display panel interposed between said instrument panel and a line of sight of a driver of the automobile, said interposed display panel comprising an overlapped part overlapping an overlapped part of said instrument panel;

a selective switching mechanism for selectively displaying said overlapped part of said interposed display panel or said overlapped part of said instrument panel so as to alternately or concurrently display said overlapped part of said interposed display panel and said overlapped part of said instrument panel, wherein said illumination mechanism is switchable in accordance with a selection of an image to be displayed by said overlapped part; and a light attenuator having a predetermined constant attenuation factor, for decreasing a light intensity of light emitted from said electroluminescent display panel toward said instrument panel.

38. The display panel according to claim 37, wherein said instrument panel comprises a display plate and pointers illuminated by said switchable illumination mechanism, wherein an illumination of said display plate and said pointers is turned on or off in accordance with turning on or off of the illumination of said instrument panel.

39. The display panel according to claim 37, wherein said instrument panel comprises a display plate and pointers, wherein said pointer comprises a self-illuminating mechanism therein, and wherein said self-illuminating mechanism is turned on or off in accordance with turning on or off of the illumination of said instrument panel.

40. A combined display panel comprising:

a first display panel having illuminating means adapted to be turned on or off;

a second display panel disposed in front of the first display panel to overlap at least a part of the first display panel, wherein an overlapped part and a non-overlapped part are formed on the combined display panel, the displays forming part of the overlapped part being selectively switched among three modes, including a first mode in which the first display panel is turned on while the second display panel is turned off, a second mode in which the first display panel is turned off while the second display panel is turned on, and a third mode in which both the first and second display panels are turned on; and a light attenuator having a predetermined constant transparency, for decreasing an intensity of light emitted from the second panel toward the first panel, the light attenuator being interposed between the first display panel and the second display panel.

* * * * *